(12) United States Patent
Miller et al.

(10) Patent No.: US 10,800,275 B2
(45) Date of Patent: Oct. 13, 2020

(54) HYBRID VEHICLE SYSTEM

(71) Applicant: Ford Global Technologies, LLC, Dearborn, MI (US)

(72) Inventors: Kenneth James Miller, Canton, MI (US); Jude Berthault, Ypsilanti, MI (US); Walter Joseph Ortmann, Saline, MI (US); Jeffrey Alan Palic, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 15/869,884

(22) Filed: Jan. 12, 2018

(65) Prior Publication Data

US 2019/0217711 A1 Jul. 18, 2019

(51) Int. Cl.
| | | |
|---|---|---|
| B60L 53/14 | (2019.01) | |
| B60P 3/06 | (2006.01) | |
| B60L 50/15 | (2019.01) | |
| B60L 58/12 | (2019.01) | |
| B60L 7/10 | (2006.01) | |
| B60P 1/64 | (2006.01) | |

(52) U.S. Cl.
CPC ............... B60L 53/14 (2019.02); B60L 7/10 (2013.01); B60L 50/15 (2019.02); B60L 58/12 (2019.02); B60P 1/64 (2013.01); B60P 3/064 (2013.01); *B60L 2200/42* (2013.01); *B60L 2260/52* (2013.01)

(58) Field of Classification Search
CPC .................................. B60L 53/50; B60L 53/57
See application file for complete search history.

(56) References Cited

U.S. PATENT DOCUMENTS

| | | | | |
|---|---|---|---|---|
| 3,947,744 | A * | 3/1976 | Grace | F15B 21/14 320/128 |
| 3,964,260 | A * | 6/1976 | Williams | B60K 25/00 60/413 |
| 4,655,039 | A * | 4/1987 | McCabe | B66F 9/20 417/218 |
| 4,723,107 | A * | 2/1988 | Schmid | F15B 21/14 318/139 |
| 5,579,227 | A * | 11/1996 | Simmons, Jr. | B66F 9/24 340/438 |
| 6,226,582 | B1 * | 5/2001 | Adsett | B66F 9/20 180/315 |
| 6,236,927 | B1 * | 5/2001 | Sherman | B60L 7/006 701/70 |
| 6,866,350 | B2 | 3/2005 | Palmer et al. | |
| 7,207,405 | B2 * | 4/2007 | Reid | H01M 8/04373 180/65.31 |
| 7,712,760 | B2 * | 5/2010 | Ohtomo | B60W 10/08 280/422 |
| 7,770,696 | B2 * | 8/2010 | Futahashi | F15B 21/14 187/224 |

(Continued)

*Primary Examiner* — Katy M Ebner
(74) *Attorney, Agent, or Firm* — David Kelley; Brooks Kushman P.C.

(57) ABSTRACT

A vehicle includes an electric machine, a detachable lift, and a controller. The detachable lift has a lift battery that is electrically connected to the electric machine. The controller is programmed to, responsive to the vehicle traveling on a predetermined route, transfer power between the electric machine and lift battery such that a lift battery charge is within a desired range at an end of the route.

20 Claims, 3 Drawing Sheets

(56) References Cited

U.S. PATENT DOCUMENTS

| | | | |
|---|---|---|---|
| 7,770,697 B2* | 8/2010 | Futahashi | F15B 21/14 187/224 |
| 7,933,695 B2 | 4/2011 | Yamaguchi | |
| 8,022,663 B2* | 9/2011 | Davis | H02J 7/345 320/104 |
| 8,203,310 B2* | 6/2012 | McCabe | B60L 50/40 320/132 |
| 8,288,989 B2* | 10/2012 | Baba | B60L 15/38 320/109 |
| 8,474,793 B2* | 7/2013 | Penenburgh | B66F 3/18 254/2 B |
| 8,515,629 B2* | 8/2013 | Medwin | B66F 9/0755 701/50 |
| 8,700,284 B2* | 4/2014 | Wojtkowicz | B60L 50/52 701/70 |
| 8,886,378 B2* | 11/2014 | Hammer | G01M 17/007 701/22 |
| 9,079,755 B2* | 7/2015 | Han | B66F 9/22 |
| 9,278,841 B2* | 3/2016 | Precenth | B66F 9/065 |
| 9,422,141 B2* | 8/2016 | Foley | B66F 9/24 |
| 9,457,666 B2* | 10/2016 | Caldeira | B60L 53/00 |
| 9,780,567 B2* | 10/2017 | Hunt | H02J 3/26 |
| 9,821,990 B2* | 11/2017 | Zanichelli | B66F 9/08 |
| 9,963,331 B1* | 5/2018 | Holmberg | G05D 1/0212 |
| 10,093,526 B2* | 10/2018 | D'Andrea | B66F 9/063 |
| 10,145,881 B1* | 12/2018 | Salter | B60L 3/12 |
| 10,160,410 B2* | 12/2018 | Brunais | B60L 50/61 |
| 10,322,042 B2* | 6/2019 | Khafagy | A61F 13/513 |
| 10,333,338 B2* | 6/2019 | Zenner | B60R 16/033 |
| 10,446,036 B2* | 10/2019 | Kanai | G08G 1/096716 |
| 10,479,258 B2* | 11/2019 | Souschek | B62K 3/002 |
| 10,538,421 B2* | 1/2020 | Blevins | B65G 1/1375 |
| 2006/0070793 A1* | 4/2006 | Akao | B66F 9/22 180/422 |
| 2007/0090808 A1* | 4/2007 | McCabe | B66F 9/07531 320/137 |
| 2010/0065344 A1 | 3/2010 | Collings, III | |
| 2010/0186404 A1* | 7/2010 | Yasufuku | B66F 9/22 60/459 |
| 2016/0055743 A1* | 2/2016 | Raj | B60L 53/14 701/22 |
| 2017/0182924 A1* | 6/2017 | Lendo | B60R 16/0215 |
| 2018/0273364 A1* | 9/2018 | Yahner | B66F 7/20 |
| 2018/0370386 A1* | 12/2018 | Lery | B61D 49/00 |
| 2019/0002258 A1* | 1/2019 | Zhou | F04B 23/02 |
| 2019/0110395 A1* | 4/2019 | Andersson | G05D 1/0287 |
| 2019/0135158 A1* | 5/2019 | Outoukian | B60L 53/14 |
| 2019/0135598 A1* | 5/2019 | Agarwal | G05D 1/0088 |
| 2019/0137991 A1* | 5/2019 | Agarwal | G05D 1/0011 |
| 2019/0193582 A1* | 6/2019 | Matsuoka | B60L 53/53 |

* cited by examiner

HYBRID VEHICLE SYSTEM

TECHNICAL FIELD

The present disclosure relates to hybrid vehicles and hybrid vehicle powertrain configurations.

BACKGROUND

Hybrid vehicles may utilize multiple power sources to generate power within a powertrain of the hybrid vehicle.

SUMMARY

A vehicle includes an electric machine, a detachable lift, and a controller. The detachable lift has a lift battery that is electrically connected to the electric machine. The controller is programmed to, responsive to the vehicle traveling on a predetermined route, transfer power between the electric machine and lift battery such that a lift battery charge is within a desired range at an end of the route.

A system includes a vehicle, a forklift, and a controller. The vehicle has an electrical powertrain system. The forklift is configured to dock with the vehicle such that a forklift battery is electrically connected to the powertrain system. The controller is programmed to, responsive to the vehicle traveling on a predetermined route while the forklift is docked, transfer power between the powertrain system and forklift battery such that a forklift battery charge is within a desired range at an end of the route.

A method includes docking a forklift to a vehicle such that a forklift battery is electrically connected to an electric machine and a traction battery of the vehicle. The method also includes transferring power between the electric machine, traction battery, and forklift battery while the vehicle is traveling on a predetermined route and while the forklift is docked such that a forklift battery charge is within a desired range at an end of the route.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
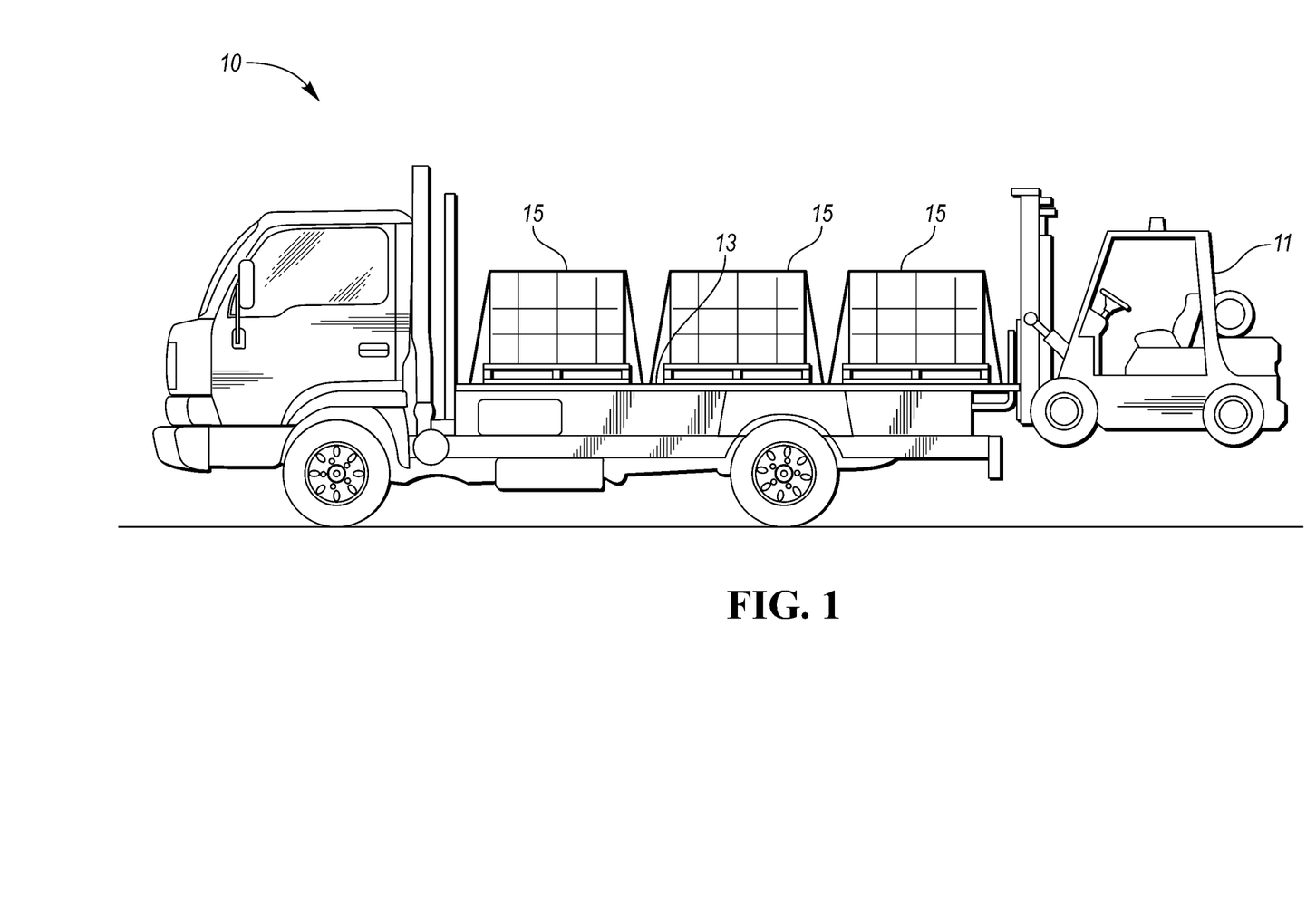
FIG. 1 is a perspective view of a hybrid vehicle having a cargo bed and a detachable forklift.

Referring to FIG. 1, a perspective view of a hybrid electric vehicle (HEV) 10 is illustrated. The HEV 10 includes a detachable forklift 11 and a cargo bed 13. The HEV 10 may be configured to transport cargo 15 (or a cargo load). The cargo 15 may be disposed on the cargo bed 13 when being transported. The HEV 10 and the detachable forklift 11 may collectively be referred to as a transportation and loading/unloading system. The detachable forklift 11 may be configured to dock with the HEV 10 during transportation and may be configured to detach from the HEV 10 in order to load/unload the cargo 15 on/off the cargo bed 13.

Figure 2:
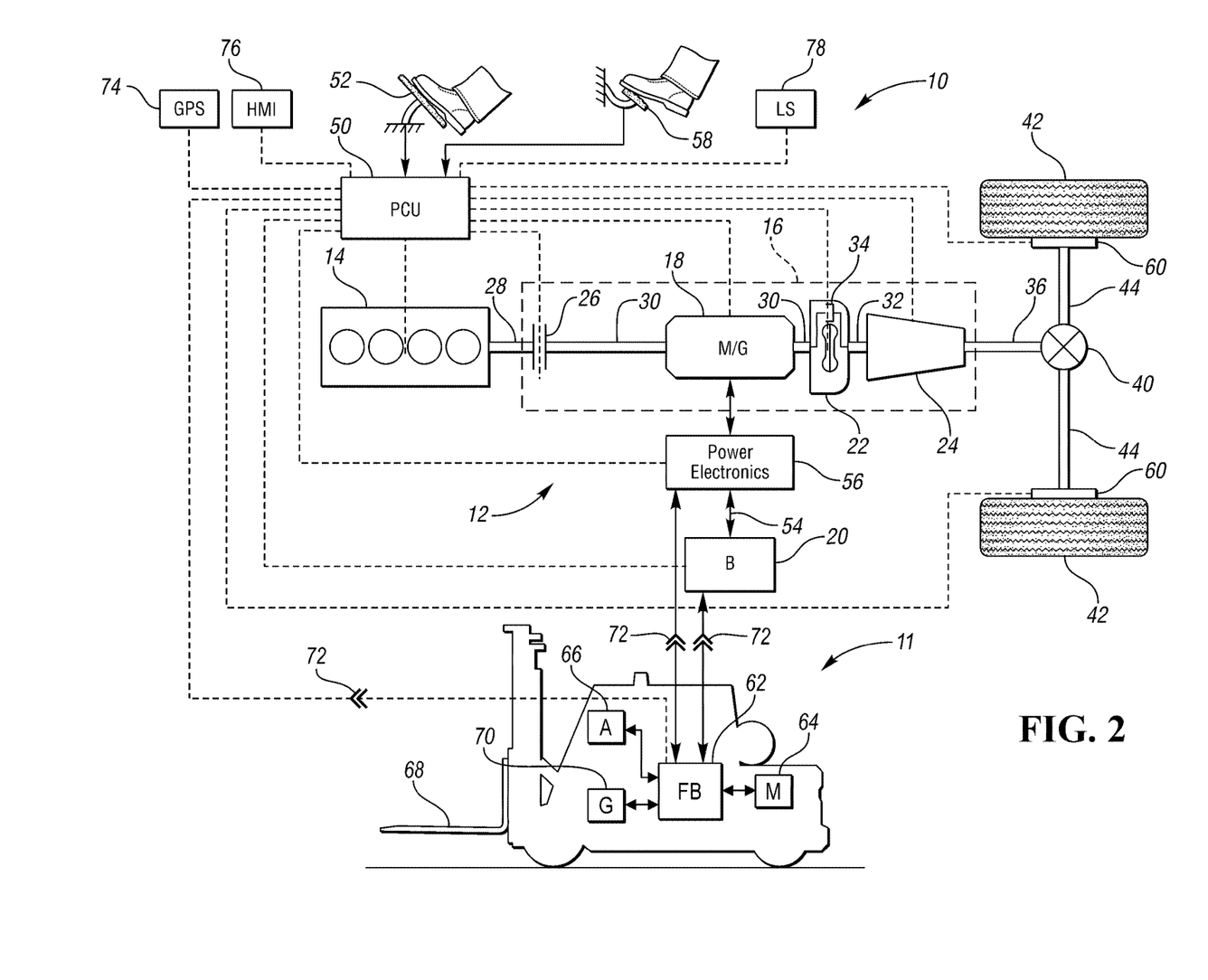
FIG. 2 is a schematic illustration of an exemplary powertrain of the hybrid vehicle and an electrical system of the forklift.

Referring to FIG. 2, a schematic diagram of the (HEV) 10 and a powertrain 12 of the HEV 10 is illustrated according to an embodiment of the present disclosure. The powertrain 12 may be referred to as an electrical powertrain system that, under certain circumstances, may propel the HEV 10 and, under other circumstances, may recuperate kinetic energy while the HEV 10 is decelerating. FIG. 2 illustrates representative relationships among the components of the HEV 10 and the detachable forklift 11 (including the electrical system of the forklift 11) when the forklift 11 is connected to the HEV 10. Physical placement and orientation of the components within the vehicle may vary. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The M/G 18 may also operate to add rotational energy to the crankshaft 28, which may occur, for example, during an engine start. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 and torque converter 22 combination is but one example of a gearbox or transmission arrangement; any multiple ratio gearbox or transmission that accepts input torque(s) from an engine and/or a motor and then provides torque to an output shaft at the different ratios is acceptable for use with embodiments of the present disclosure. For example, the transmission may be a continuously variable transmission, or an electric continuously variable transmission (e.g., a transmission utilized in series-parallel or powersplit hybrid vehicle). For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 2, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 2, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VS S), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The detachable forklift 11 may include a forklift battery 62 that is configured to provide electrical power to a motor 64 that propels the forklift 11 and to one or more actuators 66 that are configured to adjust the position of the forks 68 of the forklift 11. The forklift 11 may also include a generator 70 is configured to charge the forklift battery 62. The generator 70 may alternatively be a motor/generator that is also configured to operate as a motor to raise the forks 68. The generator 70 may be configured to recuperate energy from lowering the cargo 15 from the HEV 10. More specifically, the generator 70 may be connected to the forks 68 via a gearing arrangement (e.g., a rack and pinion gearing arrangement) that is configured to rotate the generator 70 when the forks 68 are lowered. The amount of energy recuperated via the generator $E_{recup\ gen}$ by lowering the cargo 15 from the HEV 10 may be represented by equation (1):

$$E_{recup\ gen} = mgh - E_{lim/loss} \quad (1)$$

where m is the mass being lowered (e.g., the mass of the cargo 68 plus the mass of the forks 68), h is the distance (i.e., height) that the mass m is being lowered, g is the acceleration of gravity, and $E_{lim/loss}$ is the energy limits of or the energy lost to the mechanical and electrical systems of the forklift 11 (e.g., friction losses in any gearing connection, limits of the forklift battery 62 battery to receive chard, power output limits of the generator 70, etc.).

The detachable forklift 11 may be electrically connected to the HEV 10 by a series of electrical connections 72 when the forklift 11 is docked with the HEV 10. More specifically, the electrical connection 72 may connect the forklift battery 62 to the controller 50, the traction battery 20, and the M/G 18 (via the power electronics 56). The electrical connection 72 between the controller 50 and the forklift battery 62 may be configured to communicate a current charge of the forklift battery 62 to the controller 50. The electrical connections 72 between the forklift battery 62, the traction battery 20, and the M/G 18 may be high power or high voltage electrical connections relative to a low power or a low voltage electrical connection between the forklift battery 62 and the controller 50. Alternatively, the electrical connection between the forklift battery 62 and the controller 50 may be a wireless connection. The electrical connections between the forklift battery 62, traction battery 20, and M/G 18 (via the power electronics 56) may be configured to transfer electrical power between the forklift battery 62, traction battery 20, and M/G 18 (via the power electronics 56) in order to propel the HEV 10 via the M/G 18 or to recharge either the traction battery 20 or the forklift battery 62.

The M/G 18 may receive electrical power from either the traction battery 20 (via the power electronics 56) or the forklift battery 62 (via the power electronics 56). The traction battery 20 and the forklift battery 62 may be on the same circuit such that electrical power may be drawn from the traction battery 20 and the forklift battery 62 simultaneously. The M/G 18 may in turn deliver electrical power to either the traction battery 20 (via the power electronics 56) or the forklift battery 62 (via the power electronics 56) during regenerative braking or while the M/G 18 is being powered by the engine 14. Electrical power may also be transferred from the traction battery 20 to the forklift battery 62 in order to charge the forklift battery 62. Alternatively, electrical power may be transferred from the forklift battery 62 to the traction battery 20 in order to charge the traction battery 20.

The HEV 10 may include a global positioning system (GPS) 74. The GPS 74 may include a program that generates a predetermined route from a current location to a desired destination. The desired destination may also be referred to as the end of the predetermined route. A human machine interface (HMI) 76 may be configured to receive a desired destination (e.g., an address) from an operator of the HEV 10 and communicate the desired destination to the GPS 74. Once the desired destination has been input into the HMI 76, the GPS 74 may then generate the predetermined route from the current location to the desired destination. The GPS 74 may also communicate the predetermined route, the current location, and the desired destination to the HMI 76, which may then display a map showing the current location, the predetermined route, and the desired destination.

The HEV 10 may include a load sensor 78 that is configured to detect the mass or weight of the cargo 15 that has been loaded onto the cargo bed 13. The load sensor 78 may then be configured to communicate the mass or weight of the cargo 15 that has been loaded onto the cargo bed 13 to the controller 50.

It should be understood that the schematic illustrated in FIG. 2 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be further understood that the hybrid vehicle configuration described herein is merely exemplary and is not intended to be limited. Other non-hybrid, electric, hybrid vehicle, or autonomous vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 3:
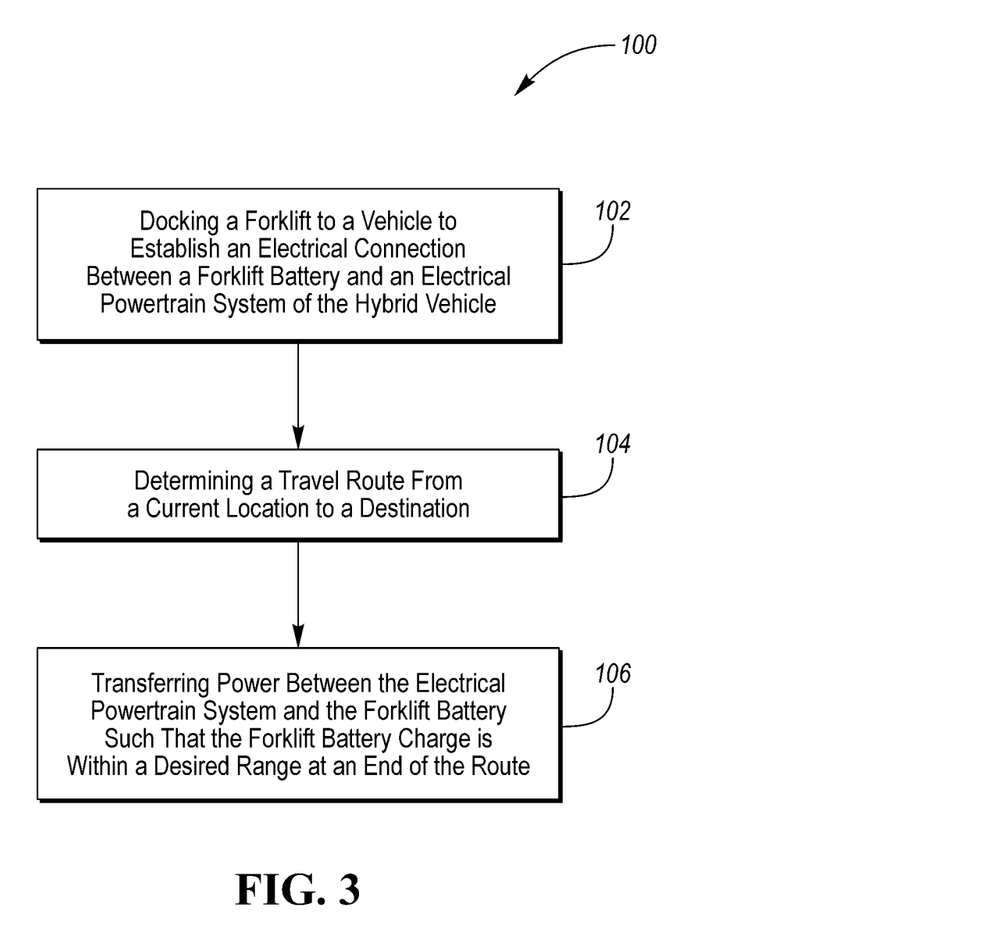
FIG. 3 is a flowchart illustrating a method of transferring electrical power between the hybrid vehicle and the forklift.

Referring to FIG. 3, a method 100 of transferring electrical power between the HEV 10 and the detachable forklift 11 is illustrated. More specifically, the method 100 may include transferring electrical power between the forklift battery 62, traction battery 20, and M/G 18 (via the power electronics 56). The method 100 may be stored as an algorithm and/or control logic within the controller 50. The controller 50 may be configured to implement the control method 100 based on various conditions of the HEV 10, subsystems of the HEV 10, the detachable forklift 11, and/or subsystems of the detachable forklift 11.

The method 100 begins at block 102, where the detachable forklift 11 is docked with the HEV 10 in order to establish an electrical connection between the forklift battery 62 and the electrical powertrain system of the HEV 10. More specifically, at block 102 electrical connections are established between the forklift battery 62 and the traction battery 20, the forklift battery 62 and the M/G 18 (via the power electronics 56), and the forklift battery 62 and the controller 50. Next, the method 100 moves on to block 104 where a travel route from a current location of the HEV 10 to a desired destination is determined. The travel route may be generated via the GPS 74 in response to a desired destination being input into the HMI 76. Once the HEV 10 is traveling on the predetermined route, the method moves on to block 106.

At block 106, electrical power is transferred between the electrical powertrain system of the HEV 10 (e.g., the M/G 18 and traction battery 20) and the forklift battery 62 such that the charge of the forklift battery 62 (i.e., the amount of energy stored in the forklift battery 62) is within a desired range when the HEV 10 reaches the end of the predetermined route (i.e., the desired destination). The desired range of the charge of the forklift battery 62 may include a minimum desired charge $C_{fb\_min}$ and a maximum desired charge $C_{fb\_max}$.

The range of the charge of the forklift battery 62 may be represented as percentages of a maximum state of charge of the forklift battery 62. The minimum desired charge $C_{fb\_min}$ may correlate with a minimum charge (i.e., minimum amount of energy) required to unload the cargo 15 from the cargo bed 13. The energy required to unload the cargo 15 may correlate with an expected operating time of the forklift 11 to unload the cargo 15. Alternatively, the energy required to unload the cargo 15 may correlate with the energy required to transport the cargo from the HEV 10 to an unloading station and/or the energy required to the lift the cargo. The minimum desired charge $C_{fb\_min}$ may include a safety factor such that the minimum desired charge $C_{fb\_min}$ is slightly more than the energy required to unload the cargo 15 to ensure that sufficient energy is reserved to unload the cargo 15.

The desired range of the charge of the forklift battery 62 for when the HEV 10 reaches the end of the predetermined route may be adjusted based on the mass of the cargo 15 and an energy recuperation estimate from lowering the cargo (see equation 1 above). For example, if the desired range of charge of the forklift battery 62 for when the HEV 10 reaches the end of the predetermined route (ignoring energy recuperation) is 70% to 80% of the maximum charge of the forklift battery 62 and it is determined that the energy recuperation estimate from lowering the cargo 15 will add an additional 10% to the charge of the forklift battery 62, the range of charge of the forklift battery 62 for when the HEV 10 reaches the end of the predetermined route may be adjusted down to 60% to 70% of the maximum charge.

The transfer of power between the electrical powertrain system of the HEV 10 and the forklift battery 62 at block 106, while the HEV is traveling on the predetermined route, may include transferring electrical power from the forklift battery 62 to the M/G 18 during acceleration events along the predetermined route that exceed power output limits of the traction battery 20 (which may be based on the current charge of the traction battery 20). The transfer of electrical power from the forklift battery 62 to the M/G 18 may occur during an EV or hybrid mode of operation. The transfer of power between the electrical powertrain system of the HEV 10 and the forklift battery 62 may also include transferring electrical power from the M/G 18 to the forklift battery 62 during regenerative braking events. The regenerative braking events may include regenerative braking events that exceed the power limits of the traction battery 20 to receive additional charge (which may be limited by the state of charge of the traction battery 20 or by a maximum recharging power that the electrical system is capable of handling without being damaged). The transfer of power between the electrical powertrain system of the HEV 10 and the forklift battery 62 may also include operating the engine 14 in order to power the M/G 18, which in turn charges the forklift battery 62 or the traction battery 20. The transfer of power between the electrical powertrain system of the HEV 10 and the forklift battery 62 may also include transferring electrical power between the traction battery 20 and the forklift battery 62, to charge either the traction battery 20 or the forklift battery 62.

An estimated end of route charge for the forklift battery 62 (i.e., a desired charge for the forklift battery 62 for when the HEV 10 reaches the end of the route) may be based on a current charge of the forklift battery 62, anticipated acceleration events on the predetermined route that deplete the forklift battery 62, and anticipated regenerative braking events on the predetermined route that charge the forklift battery 62. The estimated end of route charge for the forklift battery 62 may be utilized as a benchmark for how power is transferred between the electrical powertrain system of the HEV 10 and the forklift battery 62 at block 106, while the HEV is traveling on the predetermined route. Anticipated acceleration events may include starting after an expected stop (such as a traffic light or a stop sign) along the predetermined route, traveling up a hill located on the predetermined route, etc. The anticipated acceleration events may deplete the forklift battery 62 under circumstances where an expected power command to the M/G 18 will exceed the power limits of the traction battery 20 (which may be limited by the state of charge of the traction battery 20 or by a maximum power output that the electrical system is capable of handling without being damaged), circumstances where the traction battery 20 is depleted to a value that is less than a desirable level such that recharging of the traction battery 20 will be required, circumstances where the forklift battery 62 is charged to a value that is greater than the desired range of the charge for the forklift battery 62 (for when the HEV 10 reaches the end of the predetermined route), etc. Anticipated regenerative braking events event may include stopping at an expected stop (such as a traffic light or a stop sign) along the predetermined route, traveling down a hill located on the predetermined route, etc. The anticipated regenerative braking events may charge the forklift battery 62 under circumstances where the traction battery 20 is charged to a value that is greater than a desirable level such that recharging of the traction battery 20 is not be required, circumstances where the forklift battery 62 is charged to a value that is less than the desired range of the charge of the forklift battery 62 for when the HEV 10 reaches the end of the predetermined route, etc.

If the estimated end of route charge for the forklift battery 62 is less than the desired range at the end of the predetermined route, the engine 14 may be operated to the power the M/G 18 while the HEV 10 is traveling on the predetermined route to the charge the forklift battery 62 such that the charge of forklift battery 62 is within the desired range at the end of the predetermined route. Alternatively, the engine 14 may be operated to the power the M/G 18 while the HEV 10 is stationary to charge the forklift battery 62.

The HEV 10 may include an economy mode of operation and a fully charged mode of operation for charging/discharging the forklift battery 62. A user interface (such as a button, knob, touchscreen, etc.) may allow the user to select between the economy mode and fully charged mode. An additional option may adjust the desired range of charge for when the HEV 10 reaches the end of the predetermined route while in the economy mode to either include or ignore the energy recuperated by the forklift 11 when lowering the cargo 15. The economy mode of operation will utilize the forklift battery 62 along the predetermined route to increase fuel economy of the HEV 10 by coordinating the charging/discharging of the forklift battery 62 such the forklift battery 62 is charged to within the desired range upon reaching the end of the predetermined route. The fully charged mode of operation, on the other hand, will coordinating the charging/discharging of the forklift battery 62 such that the forklift battery 62 is fully charged upon reaching the end of the predetermined route. Stated otherwise, the fully charged mode of operation will prioritize fully charging the forklift battery 62 relative to fuel economy, while the economy mode will prioritize fuel economy (as long as the forklift battery 62 is charged to within the desired range of charge at the end of the predetermined route) over fully charging the forklift battery.

It should be understood that the flowchart in FIG. 3 is for illustrative purposes only and that the method 100 should not be construed as limited to the flowchart in FIG. 3. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
at least one drive wheel configured to propel the vehicle;
a traction battery;
an electric machine configured to, draw electrical power from the traction battery and to deliver power to the at least one drive wheel to propel the vehicle, and deliver electric power to the traction battery to recharge the traction battery;

a detachable lift vehicle, secured to and detachable from the vehicle, having a secondary battery that is configured to electrically connect to the electric machine when the detachable lift vehicle is secured to the vehicle, having a motor that is configured to draw electrical power from the secondary battery to propel the detachable lift vehicle when the detachable lift vehicle is detached from the vehicle; and a controller programmed to, responsive to the vehicle traveling on a predetermined route and the detachable lift vehicle being secured to the vehicle, transfer power between the electric machine and the secondary battery such that a secondary battery charge is within a desired range at an end of the route.

2. The vehicle of claim 1, wherein a minimum of the desired range is a minimum secondary battery charge required for the detachable lift vehicle to unload cargo from the vehicle.

3. The vehicle of claim 1, wherein the detachable lift vehicle further comprises a generator that is configured to charge the secondary battery by recuperating energy from lowering cargo from the vehicle.

4. The vehicle of claim 3, wherein the desired range is adjusted based on a mass of the cargo and an energy recuperation estimate from lowering the cargo.

5. The vehicle of claim 1, wherein the transfer of power includes transferring electrical power from the secondary battery to the electric machine during acceleration events along the route that exceed power limits of the traction battery.

6. The vehicle of claim 1, wherein the transfer of power includes transferring electrical power from the electric machine to the secondary battery during regenerative braking events along the route that exceed the power limits of the traction battery.

7. The vehicle of claim 1, wherein the vehicle further comprises an engine and the transfer of power includes operating the engine to power the electric machine to charge the secondary battery.

8. The vehicle of claim 7, wherein the controller is further programmed to, in response to an estimated end of route charge of the secondary battery being less than the desired range, operate the engine to power the electric machine to charge the secondary battery such that the secondary battery charge is within the desired range at the end of the route, wherein the estimated end of route charge is based on anticipated acceleration events on the route that deplete the secondary battery and anticipated regenerative braking events on the route that charge the secondary battery.

9. The vehicle of claim 8, wherein the estimated end of route charge is also based on a current charge of the secondary battery.

10. A system comprising:

a vehicle having an electrical powertrain system;

a forklift configured to dock with the vehicle such that a forklift battery is electrically connected to the powertrain system; and a controller programmed to, responsive to the vehicle traveling on a predetermined route while the forklift is docked, transfer power between the powertrain system and forklift battery such that a forklift battery charge is within a desired range at an end of the route.

11. The system of claim 10, wherein a minimum of the desired range is a minimum battery charge required for the forklift to unload cargo from the vehicle.

12. The system of claim 10, wherein the forklift further comprises a generator that is configured to charge the forklift battery by recuperating energy from lowering cargo from the vehicle.

13. The system of claim 12, wherein the desired range is adjusted based on a mass of the cargo and an energy recuperation estimate from lowering the cargo.

14. The system of claim 10, wherein the transfer of power includes transferring electrical power from the forklift battery to an electric machine of the electrical powertrain system during acceleration events along the route that exceed power limits of a traction battery of the electrical powertrain system.

15. The system of claim 10, wherein the transfer of power includes transferring electrical power from the electric machine to the forklift battery during regenerative braking events along the route that exceed the power limits of the traction battery.

16. The system of claim 10, wherein the vehicle further comprises an engine and the transfer of power includes operating the engine to power the electric machine to charge the forklift battery.

17. The system of claim 16, wherein the controller is further programmed to, in response to an estimated end of route charge of the forklift battery being less than the desired range, operate the engine to power the electric machine to charge the forklift battery such that the forklift battery charge is within the desired range at the end of the route, wherein the estimated end of route charge is based on anticipated acceleration events on the route that deplete the forklift battery and anticipated regenerative braking events on the route that charge the forklift battery.

18. The system of claim 17, wherein the estimated end of route charge is also based on a current charge of the forklift battery.

19. A method comprising:

docking a forklift to a vehicle such that a forklift battery is electrically connected to an electric machine and a traction battery of the vehicle; and transferring power between the electric machine, traction battery, and forklift battery while the vehicle traveling on a predetermined route and while the forklift is docked such that a forklift battery charge is within a desired range at an end of the route.

20. The method of claim 19, wherein a minimum of the desired range is a minimum battery charge required for the forklift to unload cargo from the vehicle.

* * * * *